US010178086B2

(12) United States Patent
Mattsson et al.

(10) Patent No.: US 10,178,086 B2
(45) Date of Patent: Jan. 8, 2019

(54) METHOD AND ARRANGEMENTS FOR INTERMEDIARY NODE DISCOVERY DURING HANDSHAKE

(71) Applicant: Telefonaktiebolaget LM Ericsson (publ), Stockholm (SE)

(72) Inventors: John Mattsson, Täby (SE); Robert Skog, Hässelby (SE); Salvatore Loreto, Helsinki (FI); Hans Spaak, Sollentuna (SE); Mats Näslund, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 177 days.

(21) Appl. No.: 15/039,353

(22) PCT Filed: Nov. 28, 2014

(86) PCT No.: PCT/SE2014/051425
§ 371 (c)(1),
(2) Date: May 25, 2016

(87) PCT Pub. No.: WO2015/080661
PCT Pub. Date: Jun. 4, 2015

(65) Prior Publication Data
US 2017/0163624 A1    Jun. 8, 2017

(30) Foreign Application Priority Data
Nov. 28, 2013 (SE) ........................ 1300739

(51) Int. Cl.
*H04W 8/00* (2009.01)
*H04L 29/06* (2006.01)
(Continued)

(52) U.S. Cl.
CPC ........ *H04L 63/083* (2013.01); *H04L 63/0227* (2013.01); *H04L 63/0428* (2013.01);
(Continued)

(58) Field of Classification Search
None
See application file for complete search history.

(56) References Cited

U.S. PATENT DOCUMENTS 7,543,146 B1 * 6/2009 Karandikar ............. G06F 21/33
713/175
2011/0119331 A1 * 5/2011 Zhang ............... H04L 29/12405
709/203
(Continued)

FOREIGN PATENT DOCUMENTS

WO    WO 2010/003713 A1    1/2010

OTHER PUBLICATIONS

International Search Report, Application No. PCT/SE2014/051425, dated Mar. 16, 2015.
(Continued)

*Primary Examiner* — Madhuri R Herzog
(74) *Attorney, Agent, or Firm* — Sage Patent Group

(57) ABSTRACT

A method executed by an Intermediary Node arranged between a Client and a Server for participating in the setting up of a connection between the Client and a Server is described. In response to intercepting a first message, the method transmits from the Client and destined for the Server, and requests for a connection to be set-up between the Client and the Server. The method recognizes, based on content of the received first message, that it is desirable for the Intermediary Node to perform at least one function on the requested connection, the Intermediary Node is transmitting a second message to the Client, comprising an identity of the Intermediary Node. This enables the Client to accept or reject the Intermediary Node as a node participating in the requested connection set-up.

6 Claims, 16 Drawing Sheets

(51) Int. Cl.
  *H04W 12/02* (2009.01)
  *H04W 12/06* (2009.01)
  *H04W 48/02* (2009.01)
  *H04W 76/18* (2018.01)

(52) U.S. Cl.
  CPC .......... *H04L 63/145* (2013.01); *H04L 63/166* (2013.01); *H04L 63/20* (2013.01); *H04W 8/005* (2013.01); *H04W 12/02* (2013.01); *H04W 12/06* (2013.01); *H04W 48/02* (2013.01); *H04W 76/18* (2018.02); *H04L 63/061* (2013.01); *H04L 63/164* (2013.01)

(56) References Cited

U.S. PATENT DOCUMENTS

| | | | |
|---|---|---|---|
| 2011/0296520 A1 | 12/2011 | Erofeev | |
| 2012/0166656 A1 | 6/2012 | Asveren et al. | |
| 2013/0312054 A1 | 11/2013 | Wang et al. | |
| 2014/0095865 A1* | 4/2014 | Yerra | H04L 9/3265 |
| | | | 713/156 |

OTHER PUBLICATIONS

Written Opinion of the International Searching Authority, Application No. PCT/SE2014/051425, dated Mar. 16, 2015.

Belshe et al., "Hypertext Transfer Protocol version 2.0 draft-ietf-httpbis-http2-07", Internet Engineering Task Force, HTTPbis Working Group, Internet-Draft; Intended status: Standards Track, Oct. 21, 2013, 62 pp.

Dierks et al., "The Transport Layer Security (TLS) Protocol Version 1.2", Internet Engineering Task Force, Network Working Group, Request for Comments: 5246, Category: Standards Track, Aug. 2008, 104 pp.

Fielding et al., "Hypertext Transfer Protocol—HTTP/1.1", Internet Engineering Task Force, Network Working Group, Request for Comments: 2616, Category: Standards Track, Jun. 1999, 155 pp.

Friedl et al., "Transport Layer Security (TLS) Application Layer Protocol Negotiation Extension draft-ietf-tls-applayerprotoneg-05", Internet Engineering Task Force, Network Working Group, Internet-Draft, Intended status: Standards Track, Mar. 3, 2014, 9 pp.

* cited by examiner

METHOD AND ARRANGEMENTS FOR INTERMEDIARY NODE DISCOVERY DURING HANDSHAKE

CROSS REFERENCE TO RELATED APPLICATIONS

This application is a 35 U.S.C. § 371 national stage application of PCT International Application No. PCT/SE2014/051425, filed on Nov. 28, 2014, which itself claims priority to Swedish Application No. 1300739-8, filed Nov. 28, 2013, the disclosure and content of both of which are incorporated by reference herein in their entireties. The above-referenced PCT International Application was published in the English language as International Publication No. WO 2015/080661 A1 on Jun. 4, 2015.

TECHNICAL FIELD

The present disclosure relates to methods, an Intermediary Node, a Server and a Client for performing a call set-up between the Server and the Client when the Intermediary Node is arranged between the Client and the Server.

BACKGROUND

Intermediary Nodes or proxies are important and necessary in many deployments of various application layer protocols such as e.g. Hypertext Transfer Protocol (HTTP), Hypertext Transfer Protocol Secure (HTTPS), Message Session Relay Protocol (MSRP), Session Initiation Protocol (SIP), Constrained Application Protocol (CoAP), etc. One of the most important use cases are HTTP proxies which are universally deployed in e.g. enterprises, operator networks, hotels, and airports. Another example is MSRP proxies which are abundant in MSRP deployments.

Intermediary Nodes, which may alternatively be referred to as intermediate nodes, perform services, such as e.g. traffic optimization, caching, antivirus protection, downlink content screening and filtering in e.g. schools, uplink content screening and filtering in enterprises, and message storage in the case of messaging protocols, such as e.g. MSRP.

There exist solutions for the Secure Real-time Transport Protocol (SRTP), such as e.g. in WO2010/003713 A1. However, these known solutions are not applicable for the mentioned scenario, since these solutions target another trust model where the proxy is simply not trusted to access content at all. Thus, in these solutions the proxy will not gain any access to desired content. Secondly, the aforementioned SRTP solutions use tunnel-in-tunnel and multiplexing mechanisms with additional (in our case unwanted) overhead. Thirdly, these types of solutions are SRTP-specific and do not work with TLS.

Known 3GPP IMS related mechanisms as disclosed in 3GPP TS 33.828, by which an IMS network may add/replace a Client offer for e2e security with a "hop-by-hop" security, do not offer any control or consent from the endpoints. Also, they are tightly integrated with IMS protocols (SIP, SRTP) and do not work for TLS.

Many of these application layer protocols are protected with Transport Layer Security (TLS), or Datagram Transport Layer Security (DTLS), since they can provide strong security and represent "standard" ways to protect TCP or UDP traffic implemented in most Clients and Servers. In most cases TLS or DTLS is setup before the application protocol is used. With TLS, we hereby mean all versions of TLS and its derivatives like DTLS.

When the communication is not protected with TLS, an Intermediary Node may in most cases insert itself into the communication path, i.e. by interposing itself it can potentially eavesdrop, inject, or modify traffic between sender and receiver, causing what can be referred to as "traffic intervention". When TLS is used, each Intermediary Node has only three choices, let the Client setup TLS end-to-end with the Server, break the TLS security model, or attempt to block the traffic.

Common to the three options is that in most cases the Client and the Server are not aware that there is any Intermediary Node in the communication path. If an Intermediary Node has "silently" broken the TLS (end-to-end) security model, how does the TLS Client/Server know that their traffic is not subject to unauthorized access?

Furthermore, one or more "friendly" Intermediary Nodes in the communication path still have no way of making their presence known to the TLS Client or TLS Server even if it wants to. As neither the Client nor the Server is aware of the Intermediary Node/s and their identities, they cannot include them in its communication, meaning the Intermediary Node/s must either resort to block the traffic, i.e. disabling the Client/Server communication, or it can let the traffic pass, but then it cannot fulfil the service as intended.

Even though we have referred to TLS Clients and TLS Servers above, it will be evident from the following text that corresponding, intermediary related problems can be relevant also in scenarios where TLS is, not used, or at least initially not used.

SUMMARY

Briefly described, methods, a Client, a Server and an Intermediary Node are provided which are configured to enable the mentioned end points to control the participation of the Intermediary Node when performing a connection set-up between the Client and the Server, According to a first aspect, a method, executed by an Intermediary Node when arranged between a Client and a Server, for participating in the setting up of a connection between the Client and a Server, is suggested. The suggested method is initiated by the Intermediary Node intercepting a first message, transmitted from the Client and destined for the Server, where the first message is requesting a connection to be set-up between the Client and the Server. Upon recognizing, by the Intermediary Node, based on content of the received first message, that it is desirable for the Intermediary Node to perform at least one function on the requested connection, or, in other words, that it wants to participate in the call set-up, the Intermediary Node is transmitting a second message to the Client, where the second message comprises an identity of the Intermediary Node, thereby enabling the Client to accept or reject the Intermediary Node as a node participating in the requested connection set-up.

An advantage with the suggested method is that the end points involved in the call-set-up will be able to control the call set-up.

According to one embodiment, the second message may also comprise authentication information, thereby enabling the Client to authorize the Intermediary Node. The authentication information may, comprises a signature which is calculated in dependence of at least one parameter contained in the first message.

The function, executable by an Intermediary Node may comprise at least one of: antivirus protection; content screening; intrusion detection or prevention; content adaptation or transcoding; traffic optimization; charging, caching, or policy enforcement.

According to one embodiment, the recognizing step is executed in association with deciding that at least one function associated with the requested connection needs to be executed by the Intermediary Node in order to enable the connection to be set-up, i.e. rather than indicating a desire to execute a requested call-set up, wherein, as a result, the call set-up can be executed with or without the participation of the Intermediary Node, such participation of the Intermediary Node is compulsory for performing a successful call set-up.

In addition, the second message may also comprises requirements of the Intermediary Node for performing the at least one function in association with setting up the requested connection between the Client and the Server.

The requirements of the Intermediary Node may refer to a number of various topics, such as e.g. one or more of: requesting to be able to read at least parts of received packets of the requested connection in uplink or downlink traffic; requesting to be able to modify at least parts of received packets of the requested connection in uplink or downlink traffic; requesting to be able to apply a certain type of protocol, or requesting to be able to apply certain cryptographic requirements.

According to one embodiment, the requirements comprise information on the at least one functions associated with the requested connection, i.e. the end points will be able to consider, and accept or deny the Intermediary Node to execute one or more specific functions on the connection.

Furthermore, at least part of the information provided to the Intermediary Node from the Client can be stored at the Intermediary Node for access during upcoming connection set-up attempts.

According to another aspect, a method executed by a Client, requiring to set-up a connection between a Client and a Server, wherein an Intermediary Node is arranged between the Client and the Server, is disclosed.

The Client transmits a first message, destined to the Server, requesting to set-up the connection between the Client and the Server. Once a second message, comprising an identity, identifying the Intermediary Node, is received from the Intermediary Node, the Client determines whether to accept or reject the Intermediary Node as a node participating in the requested connection set-up. After such a determination, the Client transmits a third message destined to the Server, requesting to set up the connection between the Client and the Server, with or without participation of the Intermediary Node, as determined in the determining step.

According to one embodiment, the second message also comprise requirements of the Intermediary Node for participating in the connection-set up, wherein the determining step further comprises determining which requirements to accept and which to reject, and the transmitting step further comprises to contain information on which requirements the Client accept and which requirements it rejects into the third message.

According to yet another aspect a method executed by a Server, with which a Client is requesting to set-up a connection, wherein an Intermediary Node is arranged between the Client and the Server, is disclosed.

Initially, the Client is receiving, from the Intermediary Node, a message, requesting to set up the connection between the Client and the Server, the message comprising an identity of the Intermediary Node and requirements by the Intermediary Node for participating in setting up the requested connection. Next it is determined whether to accept or reject the participation of the Intermediary Node in the connection set-up, and, following such a determination, the process is continuing the initiated set-up between the Client and the Server via the Intermediary Node, in case participation of the Intermediary Node was accepted, or terminating the set-up, in case participation of the Intermediary Node was rejected by the Server.

According to one embodiment, the set-up further comprises providing at least one encryption and/or authentication key to the Intermediary Node, thereby enabling the Intermediary Node to access the connection.

According to one embodiment, the set-up connection may enable a Transfer Layer Security (TLS) or a Datagram Transfer Layer Security (DTLS) communication.

According to another aspect, an Intermediary Node capable of participating in setting up a connection between a Client and a Server is disclosed, where the Intermediary Node is configured to: intercept a first message transmitted from the Client and destined for the Server, the first message requesting a connection to be set-up between the Client and the Server; recognize, based on content of the received first message, that it is desirable for the Intermediary Node to perform at least one function on the requested connection, and transmit a second message to the Client, comprising an identity of the Intermediary Node, thereby enabling the Client to accept or reject the Intermediary Node as a node participating in the requested connection set-up.

The Intermediary Node may further be configured to insert also authentication information into the second message, thereby enabling the Client to authorize the Intermediary Node. According to one embodiment, the inserted authentication information comprises a signature which is calculated in dependence of at least one parameter contained in the first message.

The Intermediary Node may be configured to recognize a desire for execution of a function, including at least one of: antivirus protection; content screening; intrusion detection of prevention; content adaptation or transcoding; traffic optimization; charging; caching, or policy enforcement.

According to one embodiment, the Intermediary Node is configured to perform said recognizing step in association with deciding that at least one function associated with the requested connection needs to be executed by the Intermediary Node in order to enable the connection to be set-up.

According to one embodiment, the Intermediary Node is configured to insert requirements of the Intermediary Node for performing the at least one function in association with setting up the requested connection between the Client and the Server.

The Intermediary Node may be configured to insert requirements comprising at least one of: requesting to be able to read at least parts of received packets of the requested connection in uplink or downlink traffic; requesting to be able to modify at least parts of received packets of the requested connection in uplink or downlink traffic; requesting to be able to apply a certain type of protocol, or requesting to be able to apply certain cryptographic requirements.

The Intermediary Node may be configured to insert requirements comprising information on the at least one functions associated with the requested connection.

The Intermediary Node may also be configured to store at least part of the information provided to the Intermediary Node from the Client so that it will have access to such information during upcoming connection set-up attempts.

According to another aspect, a Client, capable of setting-up a connection with a Server when an Intermediary Node is arranged between the Client and the Server, is described. According to one embodiment, such a Client is configured to: transmit a first message destined for the Server, requesting to set up the connection between the Client and the Server; receiving a second message from the Intermediary Node, comprising an identity, identifying the Intermediary Node; determine, whether to accept or reject the Intermediary Node as a node participating in the requested connection set-up, and transmit a third message destined for the Server, requesting to set up the connection between the Client and the Server with or without participation of the Intermediary Node as determined in the determining step.

Furthermore, the Client may be configured to: provide, into the second message, also requirements of the Intermediary Node for it to participating in the connection-set-up; determine which requirements to accept and which to reject, and provide, into the third message, information on which requirements the Client accept and which requirements it rejects. Thereby, the Client will be able to make a decision based on the level of detail provided in the given information.

According to yet another aspect a Server, capable of setting up a connection with a Client when an Intermediary Node is arranged between the Client and the Server, is disclosed. According to one embodiment, the Server is configured to: receive, from the Intermediary Node, a message, requesting to set up the connection between the Client and the Server, the message comprising an identity of the Intermediary Node and requirements by the Intermediary Node for participating in setting up the requested connection; determining whether to accept or reject the participation of the Intermediary Node in the connection set-up, and continuing the initiated set-up between the Client and the Server via the Intermediary Node, in case participation of the Intermediary Node was accepted, or terminating the set-up, in case participation of the Intermediary Node was rejected by the Server.

According to one embodiment, the Server is also configured to continue the connection set-up by providing at least one encryption and/or authentication key to the Intermediary Node, thereby enabling the Intermediary Node to access the connection.

The server may be configured to set up Transfer Layer Security (TLS) or a Datagram Transfer Layer Security (DTLS) communication.

According to another aspect, an Intermediary Node capable of participating in setting up a connection between a Client and a Server is suggested which comprise a processor and a memory, capable of storing instructions which when executed by the processor causes the Intermediary Node to: intercept a first message transmitted from the Client and destined for the Server, the first message requesting a connection to be set-up between the Client and the Server; recognize, based on content of the received first message, that it is desirable for the Intermediary Node to perform at least one function on the requested connection, and transmit a second message to the Client, comprising an identity of the Intermediary Node, thereby enabling the Client to accept or reject the Intermediary Node as a node participating in the requested connection set-up.

According to another aspect, a computer program, executable on an Intermediary Node, capable of participating in setting up a connection between a Client and a Server is described where, the computer program comprise instructions which when run on the intermediary Node causes the Intermediary Node to: intercept a first message transmitted from the Client and destined for the Server, the first message requesting a connection to be set-up between the Client and the Server; recognize, based on content of the received first message, that it is desirable for the Intermediary Node to perform at least one function on the requested connection, and transmit a second message to the Client, comprising an identity of the Intermediary Node, thereby enabling the Client to accept or reject the Intermediary Node as a node participating in the requested connection set-up.

According to another aspect, a computer program product, comprising a computer program, such as the one described above, and a computer readable means on which the computer program is stored.

According to another aspect, a Client, capable of setting-up a connection with a Server when an Intermediary Node is arranged between the Client and the Server, comprising a processor and a memory, capable of storing instructions which when executed by the processor causes the Client to: transmit a first message destined for the Server, requesting to set up the connection between the Client and the Server; receiving a second message from the Intermediary Node, comprising an identity, identifying the Intermediary Node; determining whether to accept or reject the Intermediary Node as a node participating in the requested connection set-up, and transmitting a third message destined for the Server, requesting to set up the connection between the Client and the Server with or without participation of the Intermediary Node as determined in the determining step.

According to another aspect, a computer program, executable on a Client, capable of setting-up a connection with a Server when an Intermediary Node is arranged between the Client and the Server is described, the computer program comprising instructions which when run on the Client causes the Client to: transmit a first message destined for the Server, requesting to set up the connection between the Client and the Server; receiving a second message from the Intermediary Node, comprising an identity, identifying the Intermediary Node; determining, whether to accept or reject the Intermediary Node as a node participating in the requested connection set-up, and transmitting a third message destined for the Server, requesting to set up the connection between the Client and the Server with or without participation of the Intermediary Node as determined in the determining step.

According to yet another embodiment, a computer program product, comprising a computer program, such as the one suggested above, and a computer readable means on which the computer program is stored, is disclosed.

According to another embodiment, a Server capable of setting up a connection with a Client when an Intermediary Node is arranged between the Client and the Server is suggested. According to one embodiment, the Server comprise a processor and a memory, capable of storing instructions which when executed by the processor causes the Server to: receive, from the Intermediary Node, a message, requesting to set up the connection between the Client and the Server, the message comprising an identity of the Intermediary Node and requirements by the Intermediary Node for participating in setting up the requested connection; determining whether to accept or reject the participation of the Intermediary Node in the connection set-up, and continuing the initiated set-up between the Client and the Server via the Intermediary Node, in case participation of the Intermediary Node was accepted, or terminating the set-up, in case participation of the Intermediary Node was rejected by the Server.

According to another aspect, a computer program, executable on a Server, capable of setting up a connection with a Client when an Intermediary Node is arranged between the Client and the Server is disclosed, where, the computer program comprise instructions which when run on the Client causes the Client to: receive, from the Intermediary Node, a message, requesting to set up the connection between the Client and the Server, the message comprising an identity of the Intermediary Node and requirements by the Intermediary Node for participating in setting up the requested connection; determining whether to accept or reject the participation of the Intermediary Node in the connection set-up, and continuing the initiated set-up between the Client and the Server via the Intermediary Node, in case participation of the Intermediary Node was accepted, or terminating the set-up, in case participation of the Intermediary Node was rejected by the Server.

According to yet another aspect, a computer program product, comprising a computer program, such as the one suggested above, and a computer readable means on which the computer program is stored, is disclosed.

BRIEF DESCRIPTION OF DRAWINGS

Embodiments will now be described in more detail in relation to the accompanying drawings, in which.

DETAILED DESCRIPTION

Figure 1:
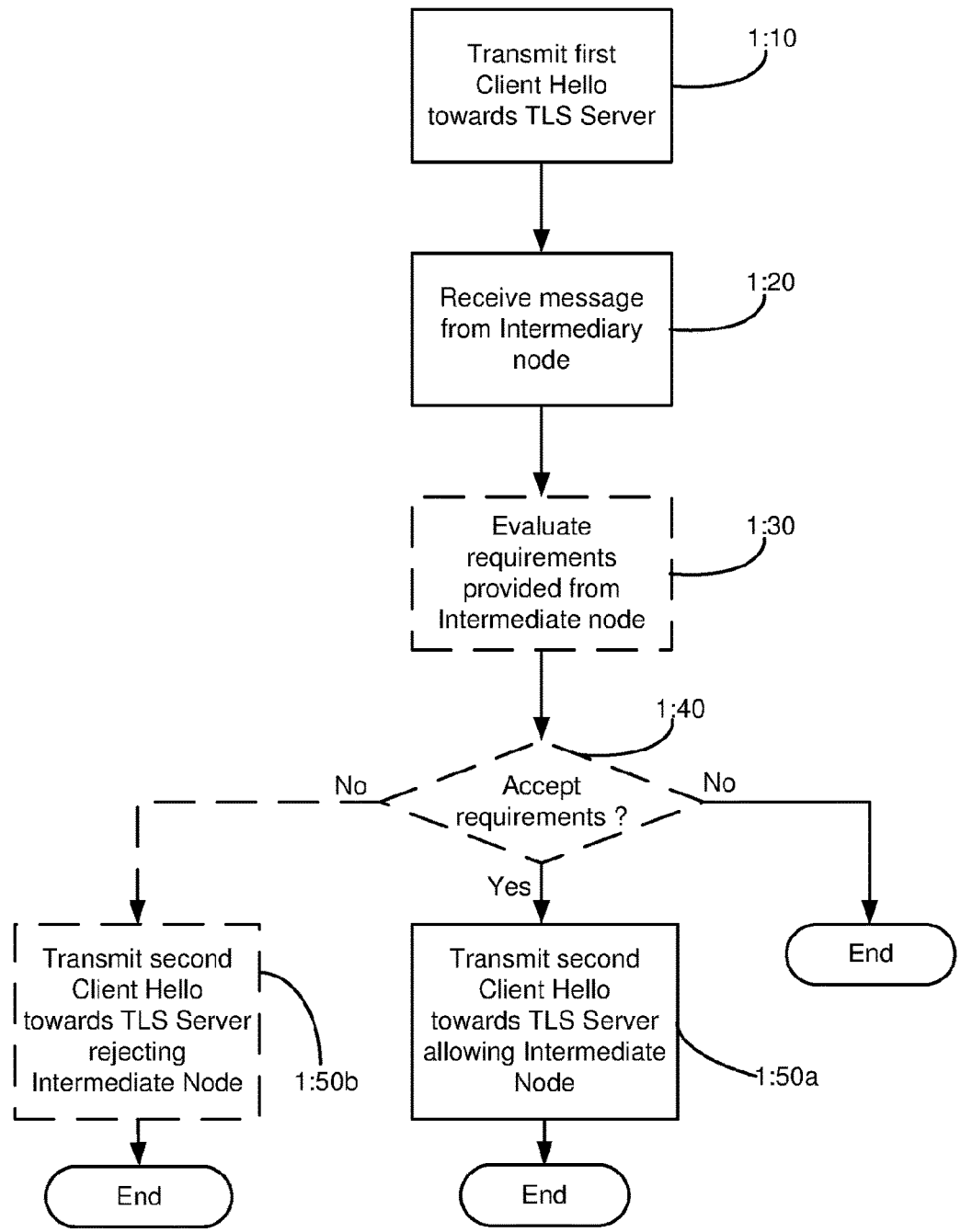
FIG. 1 is a flow chart illustrating a method executed in a TLS Client.

Presently there is no known method for a TLS Client or TLS Server to discover that there is an Intermediary Node, e.g. a proxy, demanding or suggesting that it should be included in TLS communication. The same goes for HTTP 1.0/1.1.

As the conventional TLS Client and the TLS Server is not aware that there is a network proxy in the communication path, and consequently also not of the identity of the network proxy, the Client and Server cannot act based on the proxy being there, meaning the Intermediary Node must either block the traffic or cannot fulfil the service as it was meant to do.

Briefly described, a method is disclosed which allows a TLS Client, wishing to send application data, such as e.g. HTTP 1.1, HTTP 2.0, CoAP, SPDY, SIP, MSRP, over TLS to discover, without necessary pre-configuration, that there is an Intermediary Node, such as e.g. a proxy, between a TLS Client and an intended TLS Server. The TLS Client is also made aware of the Intermediary Node's identity and the requirements the Intermediary Node has, which requirements may include the policies applied by the Intermediary Node, in order to let the TLS Client set up TLS with the intended TLS Server. The solutions also allow one or more Intermediary Node/s wishing to be included in the TLS communication to indicate its presence, identity and requirements to the TLS Client. By providing the identity of the Intermediary Node to the TLS Client, this identity can be seen as an indication to the TLS Client that the Intermediary Node wishes to participate in connection set-up.

Throughout this document, when mentioning TLS, it is to be understood that this also include the corresponding situation where instead DTLS is applied.

A TLS Client that wishes to setup a TLS connection with an intended TLS Server tries to setup a TLS connection directly with the intended TLS Server by sending a TLS ClientHello message to the TLS Server. The ClientHello message might contain information regarding the application protocol the TLS Client intends to send over the TLS connection, e.g. by using TLS application layer protocol negotiation. Mandatory elements of the ClientHello comprise Client version, a random nonce, security and compression settings.

The Intermediary Node intercepts the TLS ClientHello message, recognizes that the TLS Client is not aware of its presence, or do not fulfil its requirements. This recognition may be based on absence of certain fields (e.g. extensions) or indication of certain security settings. Therefore the Intermediary Node does not forward the ClientHello to the intended TLS Server. Instead the Intermediary Node returns a new type of message or information element, which may be referred to as a TLS signaling or error message, containing additional information related to the identity, e.g. a certificate, of the Intermediary Node and its requirements on the communication, for allowing the TLS Client to setup TLS with the intended TLS Server. The massage may be sent e.g. as a message of the TLS Alert protocol.

The message informs the TLS Client, or more specifically, the User Agent (Browser) of the TLS Client, that an Intermediary Node exists in the communication path and the additional information enables the TLS Client to make a decision on whether or not the Intermediary Node can be trusted.

The mentioned message may also contain a signature by the Intermediary Node so that the Client can authorize the sender of the message, i.e. the Intermediary Node. The signature is calculated in dependence of at least some parameters of the ClientHello, e.g. a random nonce. Unless indicated otherwise, each communication mentioned herein is to be referred to as a TLS communication executed between a TLS Client and a TLS Server via a TLS connection.

The Intermediary Node sends back information to the requesting TLS Client and supplies a header (preferably signed) and information on the name of the Intermediary Node.

Without requiring any pre-configuration, the procedure suggested above allows a TLS Client to discover that there is an Intermediary Node, between the TLS Client and a TLS Server demanding or suggesting that it should be included in a communication. On the other hand, the invention may optionally use pre-configuration e.g. providing the Client with certificates of certain trusted proxies.

Since TLS can be used to protect any application layer protocol carried over TCP, and since the method as described herein only modifies/extends the TLS protocol, it will be apparent to the person of skill in the art that the method can be practiced in the context on any such application protocol. Furthermore since the DTLS protocol is equivalent to TLS in all aspects relevant for the invention, the method can also be applied in conjunction with any protocol carried over UDP when protected by DTLS. Likewise, the method may also be practiced on derivatives of these protocols, such as e.g. SPDY or QUIC. With this in mind, the method is for illustrative purpose described mainly in TCP/TLS context.

More specifically, a TLS Client, an Intermediary Node and an intended TLS Server are considered. There may be several Intermediary Nodes in the communication path, where the described process is executed between the TLS Client and each of the Intermediary Nodes.

The TLS Client wishes to setup a TLS connection with the intended TLS Server to send application layer data securely over the TLS connection. The TLS Client is at this point not aware of the presence of any Intermediary Node and tries to setup a TLS connection directly with the intended TLS Server. Alternatively the TLS Client may be aware of one or more Intermediary Nodes, but may not be certain that one or more of these Intermediary Nodes will affect the communication with the TLS Server.

Alternatively the TLS Client may not be aware of certain details of the Intermediary Node (e.g. the identity, address, certificate, requirements).

The Intermediary Node is located somewhere in the communication path between the TLS Client and the intended TLS Server. The path may for example include a 3GPP network and the Intermediary Node may be located in that network. The Intermediary Node performs a service using the application layer data on behalf of either the TLS Client, the TLS Server or a third party, which may be e.g. an Enterprise, Auditor, Government/Regulator, Network Operator, Hotel or an Airport.

The service or function performed by the Intermediary Node may e.g. be antivirus protection, content screening, intrusion detection/prevention, content adaptation/transcoding, traffic optimization, charging, caching, or any form of policy enforcement. The service may require access to plaintext data, ability to cache content, ability to prioritize, delay, or block content, or ability to inject, modify, or replay content. Some of the services of the Intermediary Node may only require access to headers/metadata whereas other services may require full payload access.

The Intermediary Node's services may be mandated by a third party or the intended TLS Server. Alternatively the service may be recommended or optional and performed on behalf of a third party or the intended TLS Server, or the TLS Client.

A method as executed in a TLS Client will now be described in further detail with reference to FIG. 1 where in a first step 1:10, the TLS Client tries to setup a TLS communication with the TLS Server by sending a TLS ClientHello message according to standard procedures. The ClientHello message might contain information regarding the application protocol the TLS Client intends to send over the TLS connection, e.g. by using TLS application layer protocol negotiation.

The TLS Client wishes to setup a TLS connection with the TLS Server to send application layer data securely over the TLS connection. If the TLS Client is:
  aware of the presence of any Intermediary Nodes;
  knows the details regarding these Intermediary Nodes (e.g. the identity, address, certificate, requirements),
  and accept (under the requirements that the Client is aware of) to include these Intermediary Nodes into the TLS communication,
then the TLS Client includes information regarding these Intermediary Nodes into the ClientHello message, e.g. in an TLS extension. The information regarding the Intermediary Nodes can be, but are not limited to:
  the identity of the Intermediary Node (e.g. IP address, domain name, FQDN, certificate)
  public key belonging to the Intermediary Node (either a raw public key or a certificate), An Intermediary Node in the communication path between the TLS Client and the TLS Server intercepts the ClientHello message. The Intermediary Node detects/decides that it could/should perform some function, such as any of those mentioned above, on the session and therefore does not forward it to the intended TLS Server. Instead, the Intermediary Node returns an indicative message, or information element, such as e.g. an error message, e.g. a TLS signaling or error message, as indicated in another step 1:20. Such a message will contain all or a subset of the following:

A. An identity, such as e.g. a certificate, identifying the Intermediary Node. Such a certificate should preferably be signed by a trusted party so the TLS Client can later verify the certificate. The Intermediary Node may have plural certificates, and the one provided by the Intermediary Node may be selected in dependence on information initially provided in the TLS ClientHello message, indicating e.g. which application protocol the TLS Client intends to use over the TLS connection.

B. The Intermediary Node's requirements (e.g. requested permissions) on the TLS connection for allowing the TLS Client to setup a TLS connection with the intended TLS Server. Such requirements may e.g. indicate which function (s)/service(s) the Intermediary Node wishes to perform, which type of access it requires, and potentially also reasons thereof. Also information related to charging or privacy policy may be included. As already mentioned above, the requirements may be configured such that the function(s)/service(s) is optional, and, thus, a connection set-up can be executed also without the TLS Clients consent, but without execution of the respective function(s)/service(s). In the latter scenario the message referred to under B would rather comprise the Intermediary Node's requirements on the TLS connection to set up the connection and also execute the respective function(s)/services(s).

C. Any further information needed for Intermediary Node configuration, such as e.g. information typically stored in a .pac file (proxy auto-config) file used by typical browsers.

D. A signature using the Intermediary Node certificate (to be more precise, the private key associated with that certificate), or any other authentication information, covering all or selected parts of the message and the TLS ClientHello message.

The Intermediary Node can make or express any requirements or permissions on the TLS connection, for example, the Intermediary Node could request any or even all of:
  ability to read the complete uplink or downlink traffic,
  ability to read parts of the uplink or downlink traffic, i.e. some types of packets or some parts of packets,
  ability to modify all or parts of the received packets in downlink or uplink,
  application layer specific requirement, such as e.g. requirement to use a certain type of application protocol,
  cryptographic specific requirements, such as e.g. requirement to use a certain the key length, encryption and authentication algorithm, encryption key length, authorization key length, encryption algorithm, authentication algorithm, or any other part of TLS.

The requirements could be absolute requirements, mandating a specific value, maximum requirements, or minimum requirements. The requirements may be supported by a policy, i.e. the Intermediary Node could include information on reasons for certain requirements (e.g. "optimize delivery") or provide a URL where information regarding the requirements can be retrieved.

In another optional step 1:30, the TLS Client may evaluate requirements provided from the Intermediary Node against any type of security, privacy or service policy or preference and accept or reject these requirements accordingly.

Optionally, the TLS Client device may prompt the user for decision by displaying the requirements in human-readable format.

Assuming the TLS Client finds the requirements acceptable, a new Client Hello is sent towards the TLS Server, as indicated in step 1:50a. This message may comprise information related to the discovered Intermediary Node and the functions it wishes to perform. This will enable also the TLS Server to evaluate the requested permissions of the intermediary and decide if they can be accepted. If accepted, the information related to the permission will also be used by the Server to configure itself in a specific way and/or later include information to the intermediary. For example, the Server may disable encryption or may transfer certain decryption keys to the Intermediary, as will be discussed in more detail later. At this point discovery is completed and functions to securely insert the Intermediary Node are performed.

The requirements may in a later step be addressed in different ways, e.g. the requirement to read the application information could be satisfied by using the NULL encryption algorithm at the TLS Server and/or Client, by sharing the TLS downlink or uplink encryption/decryption key with the Intermediary Node, or by sharing a higher layer key so that the Intermediary Node can derive the needed encryption key. The requirements may also be rejected by the TLS Client, explicitly asking the Intermediary Node for an exception, e.g. for very sensitive information like internet banking or eHealth.

The requirements may also stipulate a specific solution, e.g. "I require the uplink encryption key" meaning that usage of the NULL encryption is not allowed.

After discovery, the information, such as the Intermediary Node's certificate, may be saved in the TLS Client (e.g. Browser), Intermediary Node/s and origin TLS Server(s), in order to simplify subsequent communication set-up via the same Intermediary Node.

If the TLS Client (user or user agent) does not find the Intermediary Node acceptable (for whatever reason) the TLS Client may in a subsequent Client Hello include information indicating that the Client has observed the intermediary's presence, but does not grant it any permission and would like to continue TLS handshake (directly to the Server and/or to some other Intermediary Node), as indicated in alternative step 1:50b. Alternatively, the TLS Client could indicate it grants a subset of the permissions.

A method executed at an Intermediary Node will now be described in further detail with reference to FIG. 2. In a first step 2:10, an Intermediary Node intercepts a first ClientHello, which is evaluated in a subsequent step 2:20. If, in step 2:20 it is determined by the Intermediary Node that it need to provide a suggestion with requirements to the TLS Client, it provides for a return message, e.g. an error message, to the TLS Client, as indicated in step 2:30, requesting the TLS Client to accept or reject the requirements. In response to such a message, provided as a second ClientHello from the TLS Client, the Intermediary Node intercepts a second ClientHello from the TLS Client, as indicated in step 2:50. The second ClientHello is evaluated in a subsequent step 2:60 and in case of at least one acceptance of the requirements (or at least some of it) the ClientHello is forwarded to the intended TLS Server, as indicated in step 2:70. If not accepted, according to one embodiment, the TLS connection cannot continue and the process is terminated, according to step 2:80a. Whether or not to return a message to the TLS Client in step 2:30 may e.g. depend on the type of service the Intermediary Node need to execute for a specific TLS connection, which may e.g. be identified from an extension in the ClientHello, or, in case the Intermediary Node is a corporate proxy, the transmitter of the ClientHello may be decisive. This may e.g. be determined from which certificate that is used. According to another embodiment, indicated with step 2:80b the message is forwarded to the TLS Server as well, also in case of a rejection of participation of the Intermediary Node, wherein none of the one or more functions indicated by the Intermediary Node will later be executed, i.e. the Intermediary Node is not accepted, but the process is continued without the involvement of the Intermediary Node. The latter step is indicated with alternative step 2:80b. It is also to be understood that requirements may be accepted partly, i.e. some are rejected while some are accepted, such that only functions executable with the allowed requirements will later be executed. Although the methods as disclosed in FIGS. 1 and 2 refer to a TLS Client and a TLS Server, it is to be understood that these methods may be applicable also for scenarios involving a non-TLS Client and a non-TLS Server, such as e.g. the scenario described with reference to FIG. 19 or 20.

Figure 3:
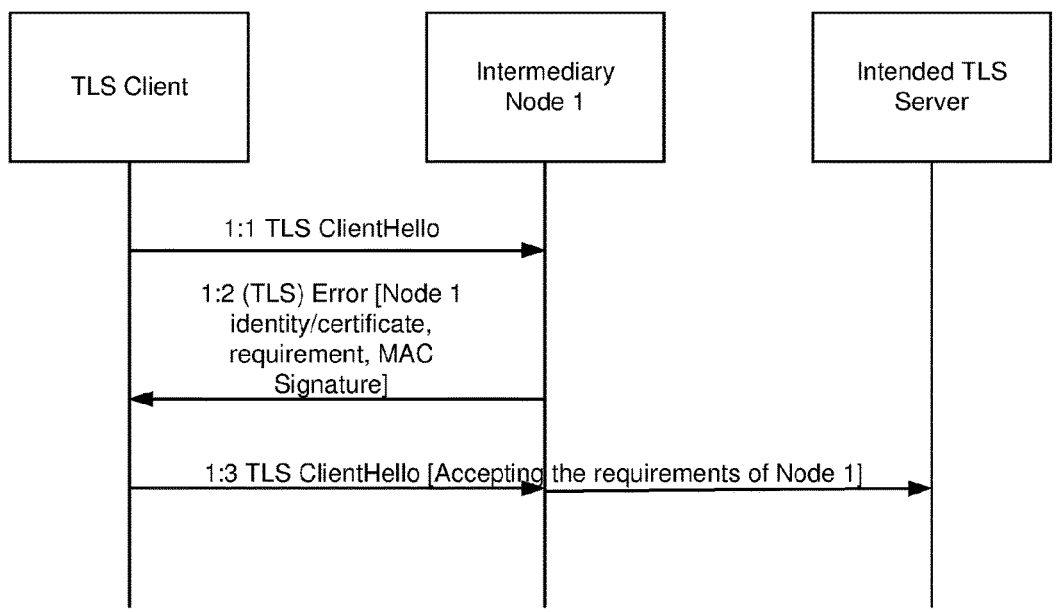
FIG. 3 is a signalling scheme illustrating signalling between a TLS Client and a TLS Server according to a first embodiment.
Figure 4:
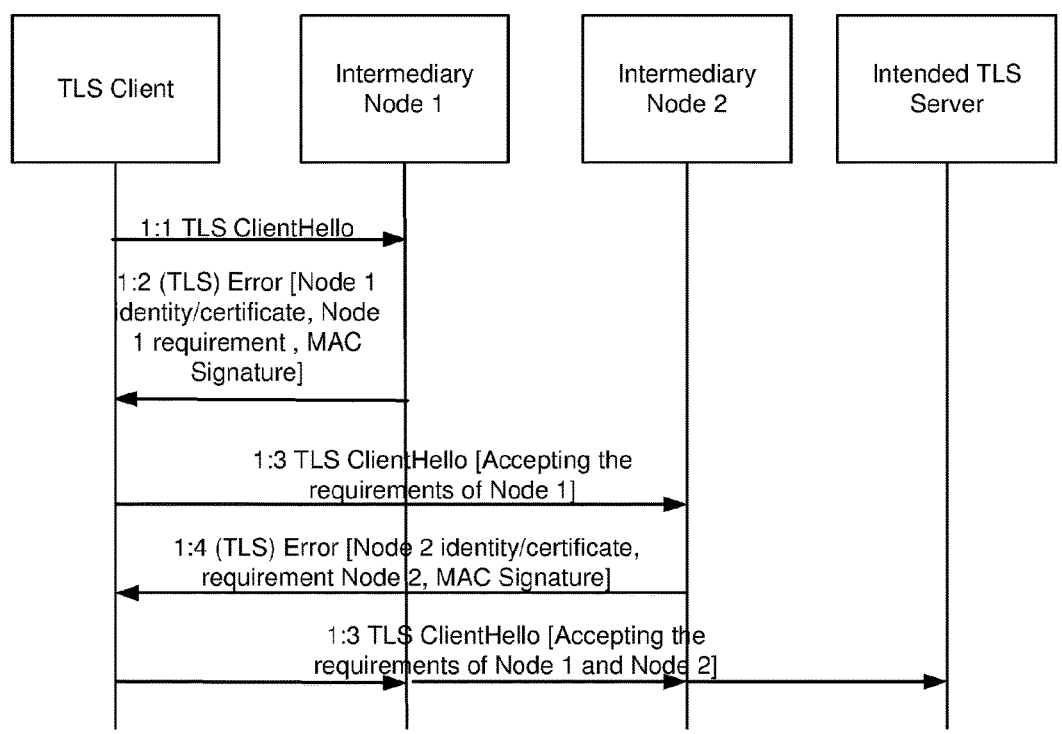
FIG. 4 is a signalling scheme illustrating signalling between a TLS Client and a TLS Server according to a second embodiment.

FIG. 3 is a signalling scheme illustrating how the method as described above can be executed on one Intermediary Node, while FIG. 4 is a corresponding signalling scheme, illustrating how a corresponding process can be executed when there are a plurality of Intermediary Nodes in the communication path between a TLS Client and a TLS Server. In step 1:1 of FIG. 3, a call-set up request is transmitted towards a TLS Server, and intercepted by the Intermediary Node 1, and in a subsequent step 1:2 the Intermediary Node 1 informs the Client about itself, as described above. In step 1:3, an acceptance of the call set-up is provided from the Client to the Server. As indicated in FIG. 4, each Intermediary Node will respond to a TLS Client Hello by transmitting a message, here an alert/error message, allowing the TLS Client to accept the requirements of the respective Intermediary Node completely, partially or reject the requirements.

Figure 5:
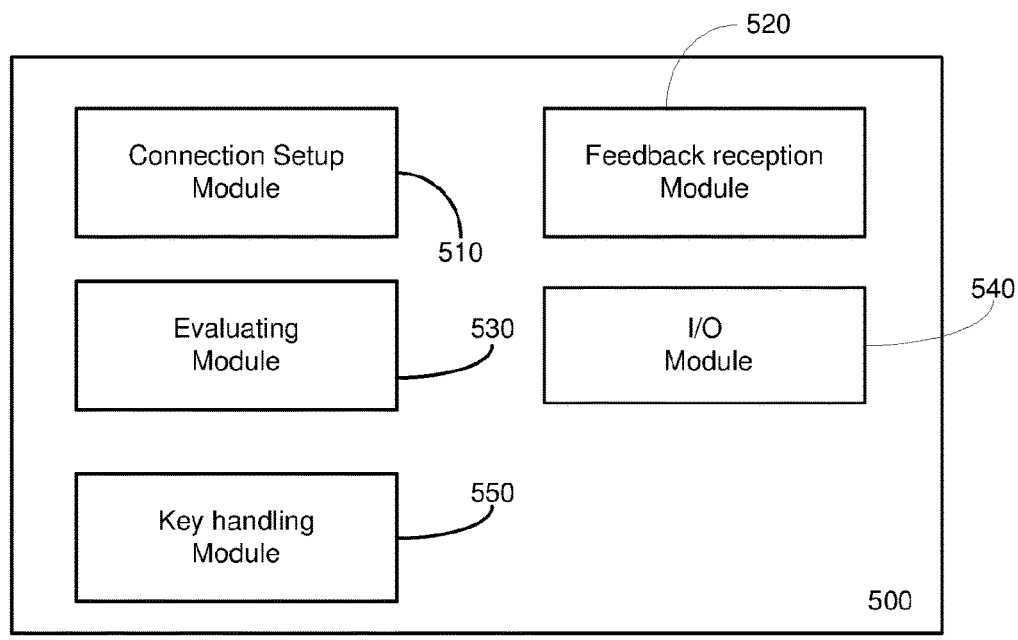
FIG. 5 is a simplified configuration of a TSI Client according to a first embodiment.

FIG. 5 is a simplified illustration of functional modules of a Client 500, here referred to as a TLS Client, where the Connection Setup Module 510 is configured to execute step 1:10 and 1:50 in FIG. 1, the feedback reception module 520 is configured to execute step 1:20 of FIG. 1, while the evaluating module 530 is configured to execute steps 1:30 and 1:40 in FIG. 1. Any type of conventional I/O module 540 is configured to enable the TLS Client 500 to communicate with a Client (not shown) and Intermediary Nodes (not shown), while a conventional key handling module 550 may be configured to handle keys provided for security purposes. It is also to be understood that also a non-TLS Client, capable of executing a method which corresponds to the one described with reference to FIG. 1, e.g. as described herein with reference to the signalling scheme of FIG. 19 or 20.

Figure 6:
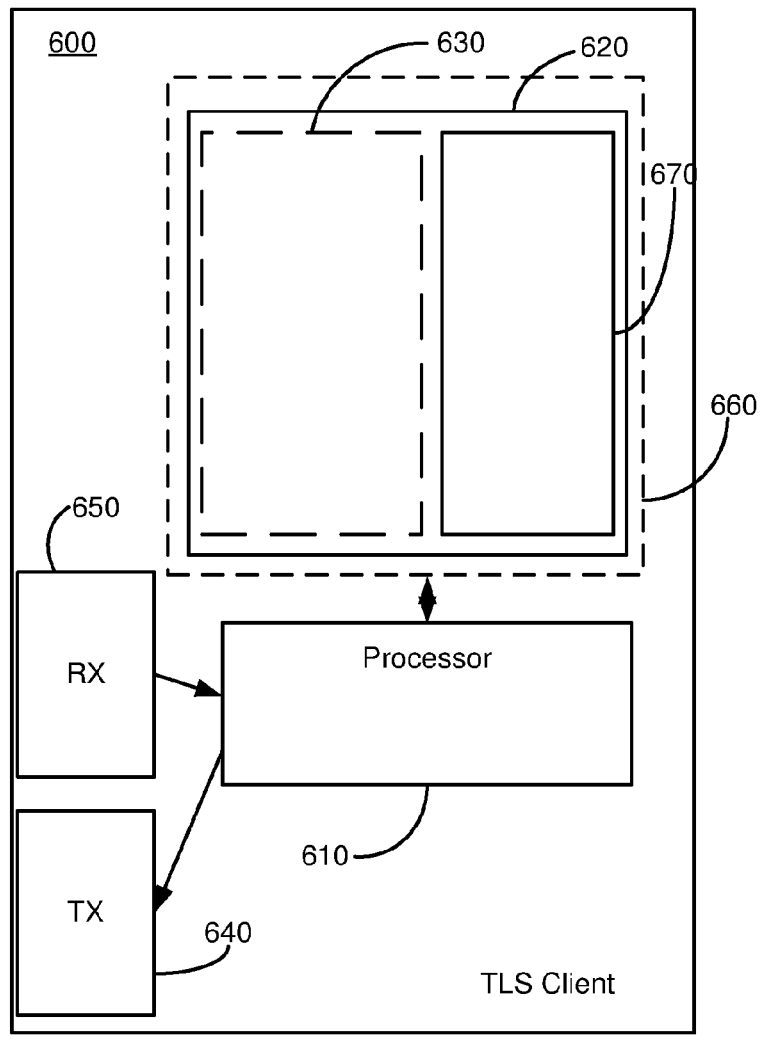
FIG. 6 is a simplified configuration of a TSI Client according to a second embodiment.

FIG. 6 is a block scheme illustrating a TLS Client according to one embodiment, where the modules of FIG. 5 may be implemented as software modules comprising executable instructions which are stored on a memory 630 of memory means 620. It is to be understood that the Client of FIG. 6 may alternatively be configured as a non-TLS Client in order to apply corresponding non-TLS scenarios.

Figure 2:
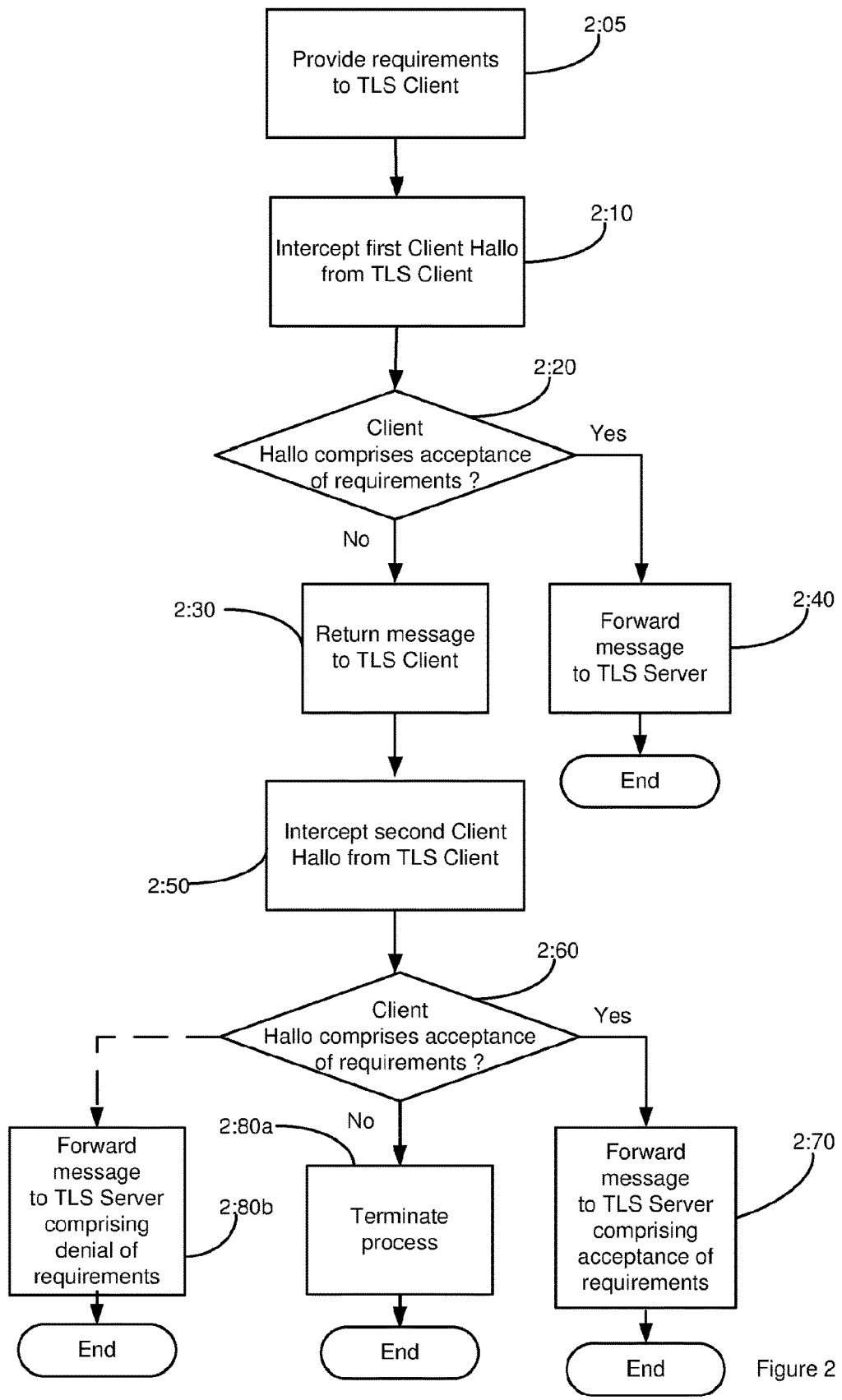
FIG. 2 is another flow chart illustrating a method executed in an Intermediary Node.
Figure 7:
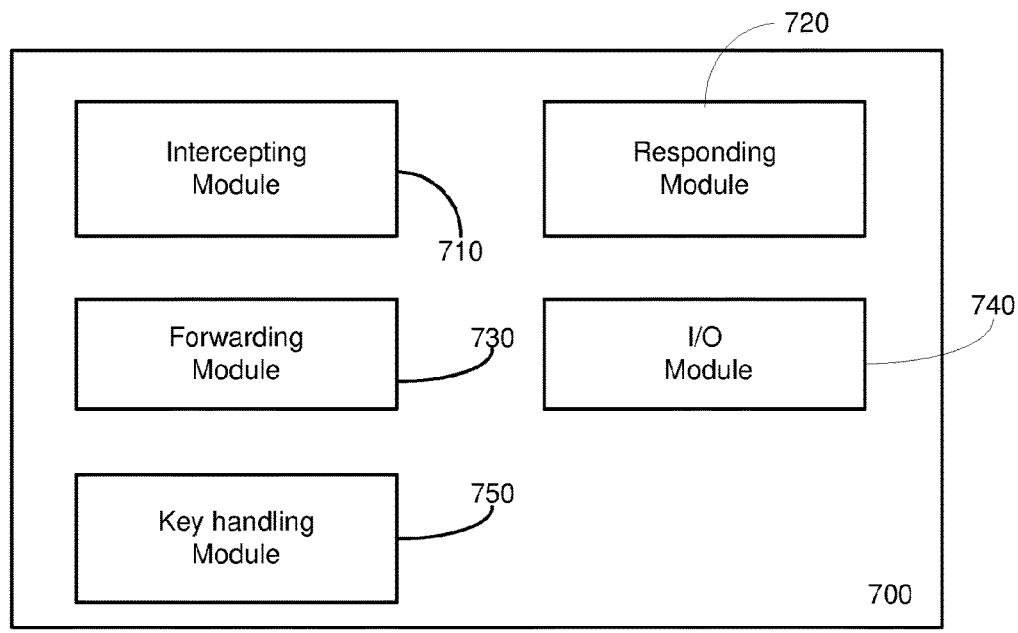
FIG. 7 is a simplified configuration of an Intermediary Node according to a first embodiment.

FIG. 7 is a simplified illustration of functional modules of an Intermediary Node, where an intercepting module 710 is configured to execute step 2:10 and 2:50 of FIG. 2, a responding module 720 is configured to execute step 2:30 and a forwarding module 730 is configured to execute steps 2:40 and 2:80. Any type of conventional I/O module 540 is configured to enable the TLS Client 500 to communicate with a Client (not shown) and Intermediary Nodes (not shown), while a conventional key handling module 550 may be configured to handle keys provided for security purposes.

Figure 8:
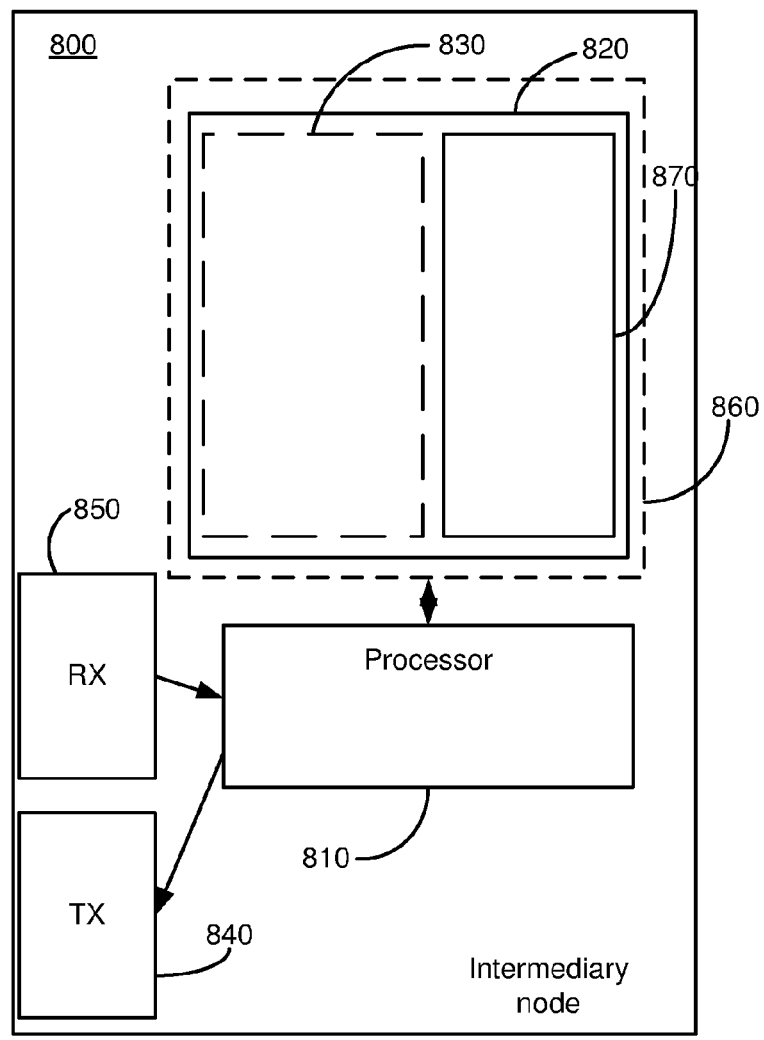
FIG. 8 is a simplified configuration of an Intermediary Node according to a second embodiment.

FIG. 8 is a block scheme illustrating an Intermediary Node according to one embodiment, where the modules of FIG. 7 may be implemented as software modules comprising executable instructions which are stored on a memory 830 of memory means 820. The Intermediary Node described with reference to FIG. 7 or 8 may be configured to handle also non-TLS Clients and non-TLS Servers, e.g. according to the description with reference to FIG. 19 or 20.

Figure 9:
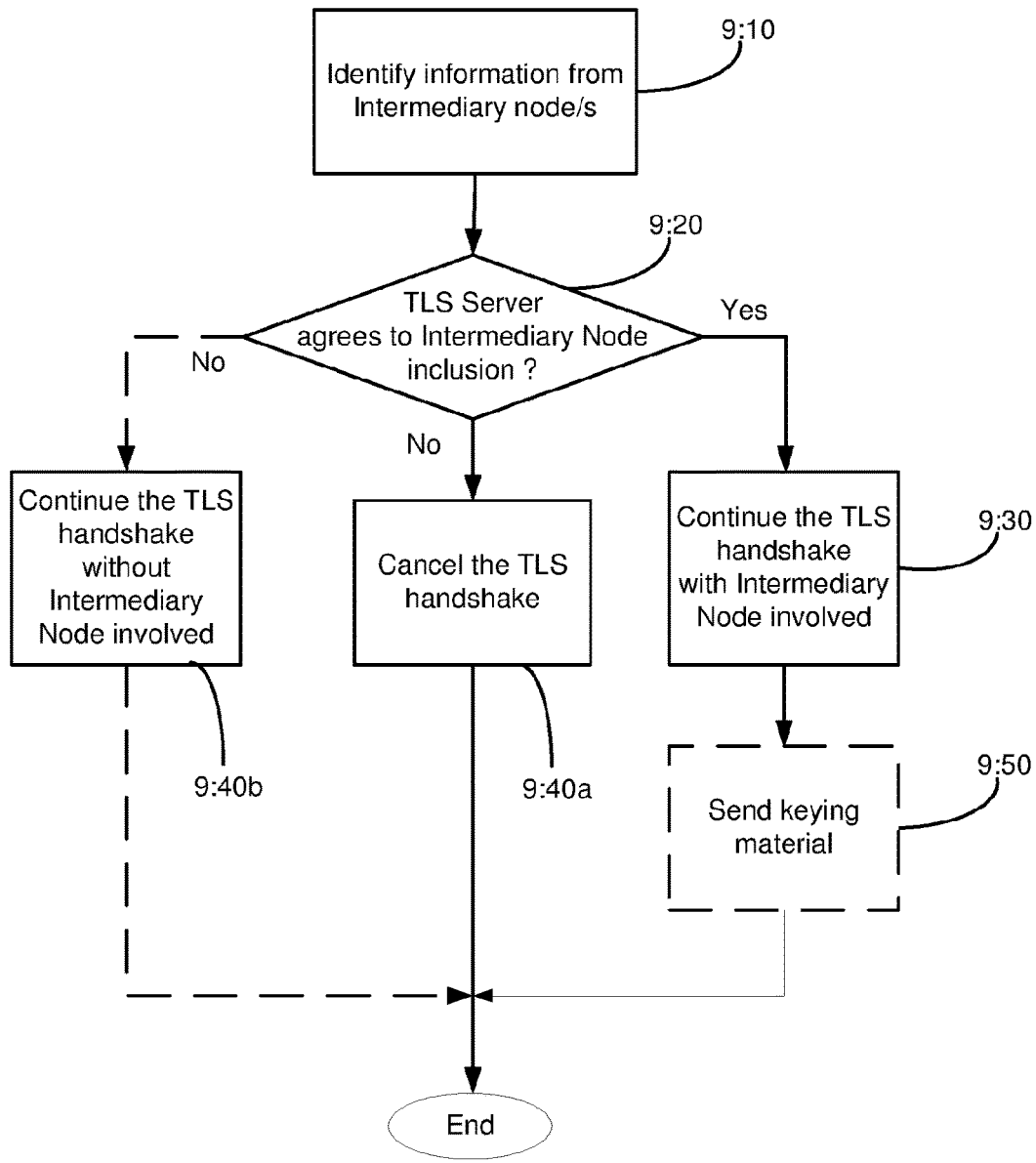
FIG. 9 is a flow chart illustrating a method executed in a TLS Server.

According to another embodiment a method is executed in a TLS Server, after a TLS Client has responded to requirements provided from an Intermediary Node, located between the TLS Client and TLS Server to the TLS Client, e.g. by accepting parts of, or all the requirements as already described above, and, as a prerequisite, the TLS Server is now involved in a TLS handshake with the TLS Client. Such a method will now be described in further detail below with reference to FIG. 9.

As indicated in a first step 9:10, the TLS Server deduces from the TLS extension the identities and requirements of one or more Intermediary Nodes that the TLS Client, according to procedures described above, has accepted for inclusion in the TLS connection. In a next step 9:20 it is determined if the TLS Server agrees to include the one or more Intermediary Nodes. If the TLS Server agrees to the inclusion of the Intermediary Nodes accepted by the TLS Client, it continues the TLS handshake with the TLS Client by sending a ServerHello with an answer to the TLS extension back to the TLS Client. This is indicated with step 9:30 in FIG. 9. If the TLS Server is aware of any more Intermediary Nodes that it wishes to include, then the TLS Server can include information regarding also these additional Intermediary Nodes into the ServerHello sent back to the TLS Client.

The information provided to the TLS Client may be structured in the same way and contain similar information elements as the Intermediary Node information already sent in the previous ClientHello, but may also be structured differently and may even be sent in a different part of the TLS message. The TLS Server makes sure that the TLS connection will fulfill the requirements of all the Intermediary Nodes. For example for each Intermediary Node in the path that require access to key material, the TLS Server also includes the needed key material in the ServerHello. The keying material should be encrypted so that only the intended Intermediary Node can decrypt it, but the keys may alternatively be sent unencrypted. The keying material can comprise any key used internally in TLS connections. It may for example be all or any of encryption key/s used for uplink or downlink traffic, and authentication key/s used for uplink or downlink traffic.

The TLS Server may also derive keys from the encryption or authentication keys and send these to the Intermediary Nodes, as will be described in further detail below. If such derived keys are used by the TLS Client or TLS Server to encrypt or integrity protect some packets or only part of all or some packets. A respective Intermediary Node is restricted to only decrypt/modify the packets/parts processed with the derived key and not the packets/parts processed with the normal TLS encryption/authentication key.

The keying material transferred to the Intermediary Node can for example be encrypted in some of the following ways:

With a public key belonging to the Intermediary Node. The public key may be known in advance by the TLS Server, included in the ClientHello, or fetched from some third party after receiving the ClientHello by using the identity of the Intermediary Node, or derived by using the identity of Intermediary Node (e.g. using identity based encryption).

With a shared secret (symmetric key, password) shared by the TLS Server and the Intermediary Node. The shared secret may be known in advance by the TLS Server, included in the ClientHello, or fetched from some third party after receiving the ClientHello by using the identity of the Intermediary Node.

The Intermediary Nodes can by looking at the TLS ServerHello check that the TLS connection will fulfill their requirements and that the TLS Server has accepted their inclusion in the TLS communication. The Intermediary Nodes extract any keying material intended for them and if needed decrypts the keying material. The Intermediary Nodes store the keying material for use on TLS record layer packets that will be transferred between Client/Server.

The TLS Client can see from the ServerHello that the TLS Server has accepted the inclusion of the Intermediary Node/s and their capabilities.

If the TLS Client and/or TLS Server is/are aware of the presence of Intermediary Nodes but does not wish to agree to include these Intermediary Nodes, or do not agree to some of the Intermediary Nodes' requirements on the TLS connection, it may indicate this in the ClientHello, asking the Intermediary Node(s) to forward the ClientHello message to the TLS Client anyway. The TLS Client may also indicate the reasons why it wish a specific Intermediary Node to be excluded (e.g. highly secure or sensitive information like internet banking) or the reasons why it should be excluded (like paying for the service to be excluded, or having special privileges).

If the TLS Client or Server do not agree to include the Intermediary Nodes and give them the specified abilities then the TLS Client or TLS Server can cancel the TLS handshake and may instead send an error message indicating this to the other party. In case the TLS Server makes such a decision, this is indicated in step 9:40*a*. Alternatively, the TLS Server may also have the option of choosing to continue the TLS handshake, but without involving the Intermediary Node, in case the TLS Server disagrees to Intermediary Node inclusion, according to alternative step 9:40*b*.

Instead of sending keying material to the Intermediary Node/s in the ServerHello the keying material may be sent in another later message in the TLS handshake, or in a non-handshake message. The latter case is indicated with optional step 9:50 in FIG. 9. The keying material may in such a case be sent by either the TLS Client or the TLS Server.

Granting Intermediary Node/s access to TLS traffic can be done in various ways, where the access may be restricted to read access, modify access or include both accesstypes. According to one embodiment, the TLS Client/TLS Server could choose a "NULL" cryptographic transform for encryption and/or message authentication. E.g. if read access is granted, a NULL encryption algorithm may be chosen. Alternatively a cryptographic transform with "selective" protection could be chosen, e.g. an encryption algorithm which encrypts payloads but not headers, such as e.g. AEAD (authenticated encryption with additional data). Another option is to use key management, as will be described below.

The TLS handshake provides a so called master key from which encryption and authentication keys are derived. Different keys may be derived for "uplink" (Client to Server) and "downlink" (Server to Client).

To grant an Intermediary Node access to traffic content the Intermediary Node is given access to the appropriate key/s. For example, if an Intermediary Node is granted only read access for downlink traffic, only the corresponding Server-to-Client decryption key is provided to the Intermediary Node, and so on. Thus selective "read" and/or "write" access can be provided and separately for uplink and/or downlink.

A future extension to TLS connection could allow for use of further keys, e.g. different keys to protect different parts of messages and/or different keys for different types of message. In such case, a corresponding subset of key may be provided to the Intermediary Node.

Figure 10:
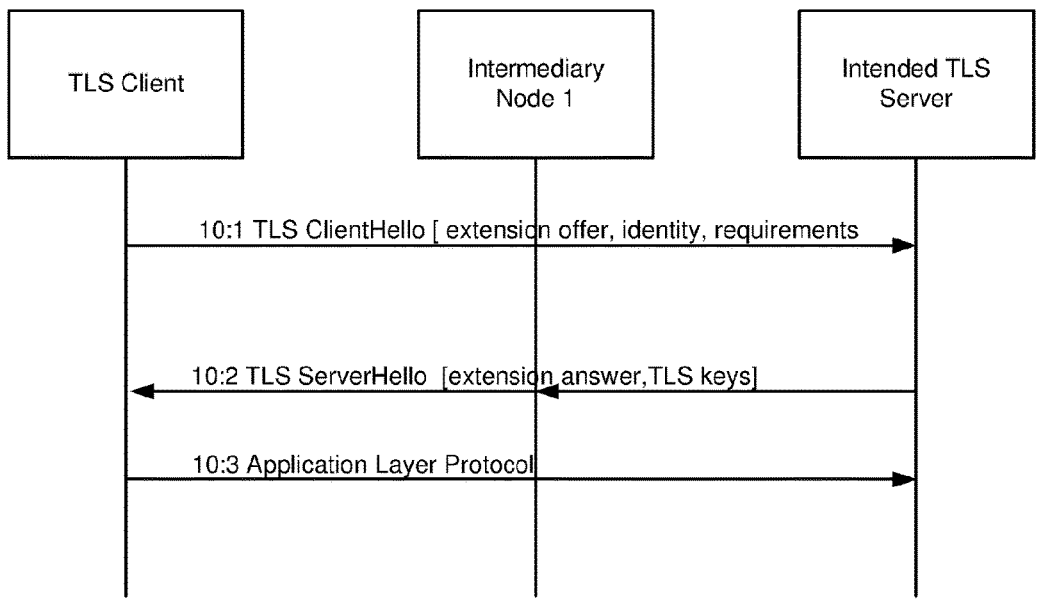
FIG. 10 is a signalling scheme illustrating signalling between a TLS Client and a TLS Server according to a third embodiment.

FIG. 10 is a signaling scheme illustrating an insertion of an Intermediary Node known to the TLS Client as described above.

Figure 11:
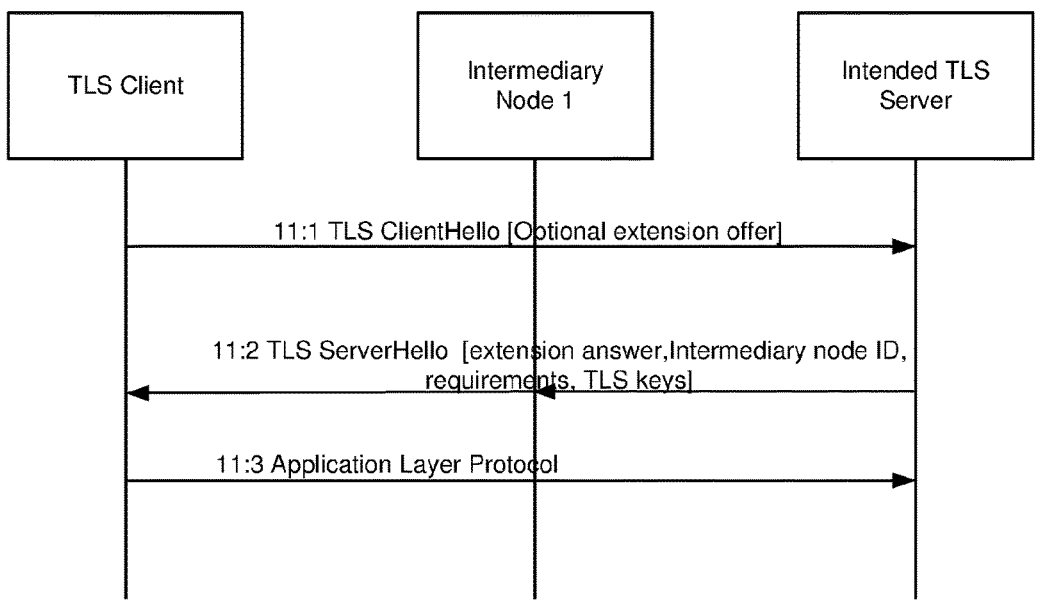
FIG. 11 is a signalling scheme illustrating signalling between a TLS Client and a TLS Server according to a fourth embodiment.

FIG. 11 is a signaling scheme illustrating an insertion of an Intermediary Node known to the TLS Server, as described above.

Figure 12:
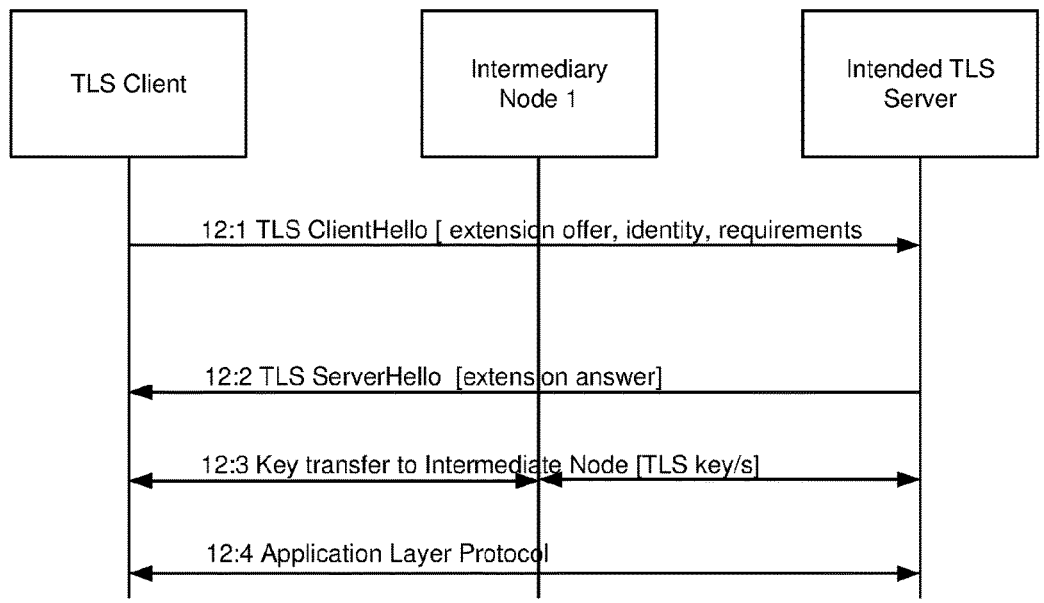
FIG. 12 is a signalling scheme illustrating signalling between a TLS Client and a TLS Server according to a fifth embodiment.

FIG. 12 is a signaling scheme illustrating how TLS key/s can be transferred subsequent to the TLS handshake, as described above.

Figure 13:
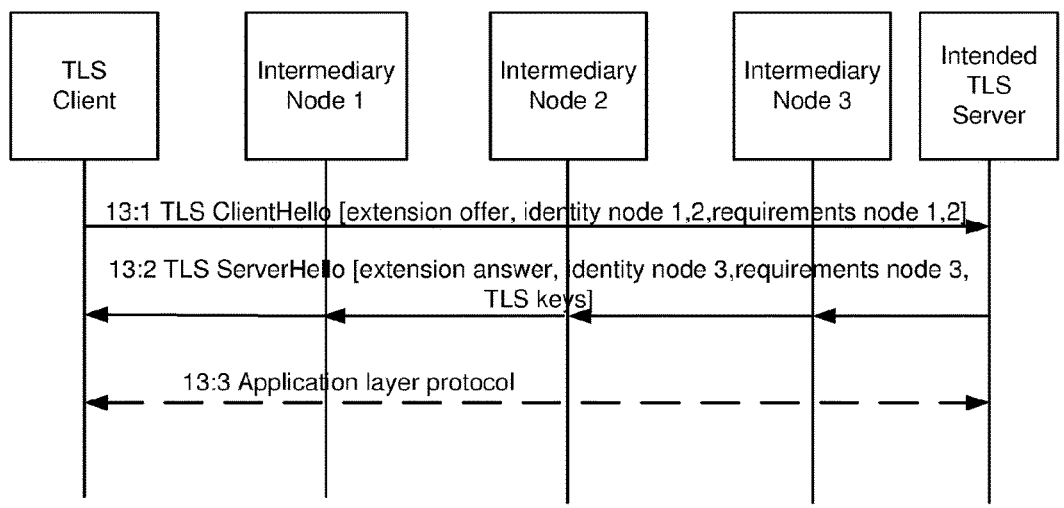
FIG. 13 is a signalling scheme illustrating signalling between a TLS Client and a TLS Server according to a sixth embodiment.

FIG. 13 is a signaling scheme illustrating how multiple Intermediary Nodes may be inserted into a TLS connection, as described above.

Figure 14:
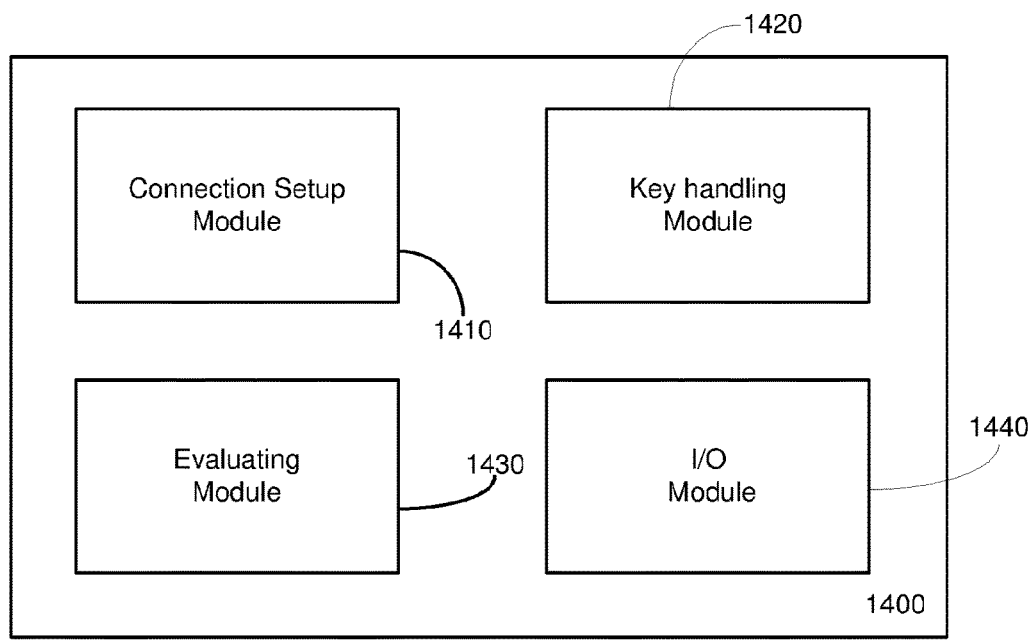
FIG. 14 is a simplified configuration of a TLS Server according to a first embodiment.
Figure 16:
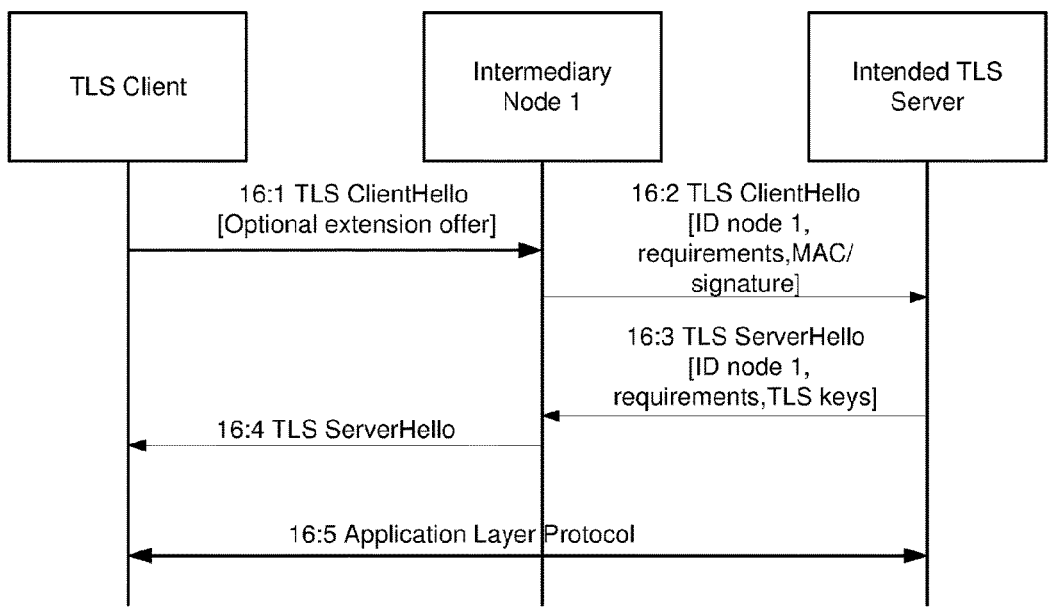
FIG. 16 is a signalling scheme illustrating signalling between a TLS Client and a TLS Server according to a seventh embodiment.

FIG. 14 is a simplified illustration of functional modules of a TLS Server, where a connection setup module 1410 is configured to execute step 16:2 of FIG. 16, an evaluation module 1430 is configured to execute step 16:3 and a key handling module 1420 is configured to handling keys to be provided to an Intermediary Node.

Figure 15:
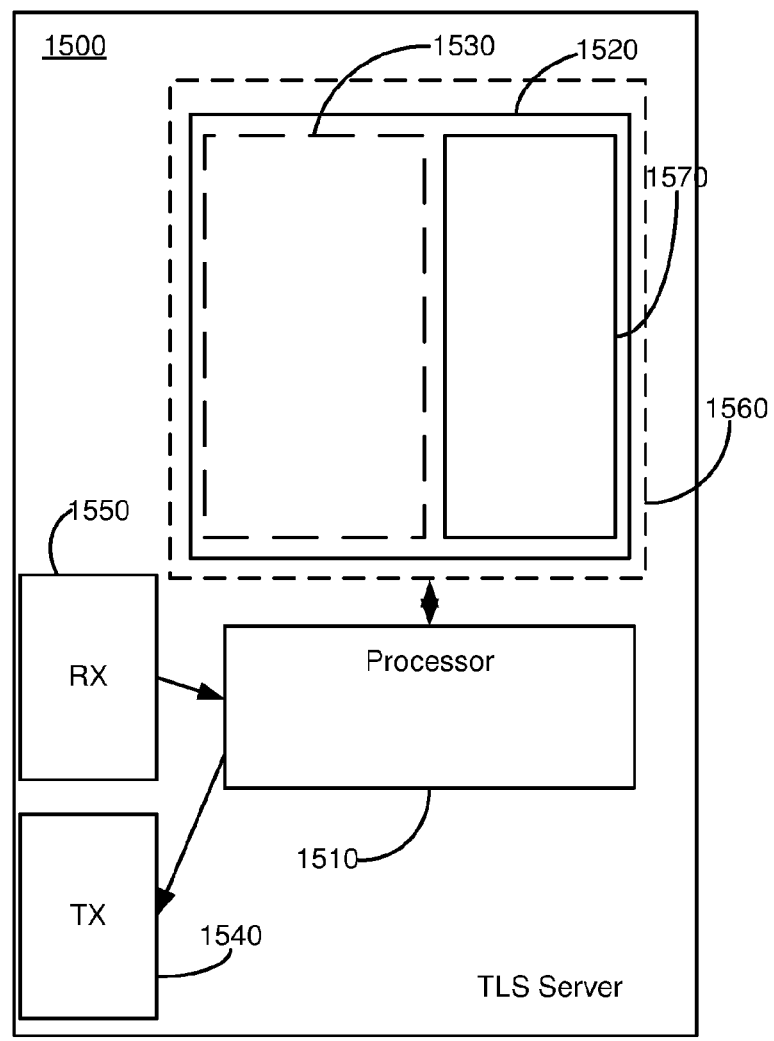
FIG. 15 is a simplified configuration of a TLS Server according to a second embodiment.

FIG. 15 is a block scheme illustrating a TLS Client according to one embodiment, where the modules of FIG. 14 may be implemented as software modules comprising executable instructions which are stored on a memory 1530 of memory means 1520. It is to be understood that the architecture, described with reference to FIG. 14 or 15 may also be applied for a non-TLS Server.

In an alternative embodiment, the Intermediary Node may make its presence known to the TLS Server instead of sending an error message back to the TLS Client. This has the benefit of reducing the number of round trips needed and therefore also the latency before the TLS Client and TLS Server can begin communicating with an appropriate application protocol. It does however require some changes to the TLS processing.

A first alternative embodiment will now be described with reference to the signaling scheme of FIG. 16.

In a first step 16:1, the TLS Client sends a ClientHello to the TLS Server, this ClientHello do not include the identity of the Intermediary Node, but it may include some kind of information (e.g. an extension), indicating that the TLS Client accepts an Intermediary Node, or that it accepts Intermediary Node/s included by the TLS Server.

In another step 16:2, the Intermediary Node intercepts the ClientHello and adds some or all of the following: The Intermediary Node's identity (e.g. by including its certificate), a list of its requirements, and a MAC/signature, proving that it was the Intermediary Node that added the information. The Intermediary Node could alternatively just forward the ClientHello and send the additional information in another, separate message to the TLS Server.

If the TLS Server agrees to include the Intermediary Node it includes the TLS keys into its ServerHello, sent in step 16:3. The TLS Server could alternatively send the keys in another message to the Intermediary Node.

The Intermediary Node intercepts the ServerHello and removes the included TLS keys and the other information not meant for the TLS Client, before the ServerHello is sent to the TLS Client, a indicated in step 16:4. With the keys the Intermediary Node can perform some service on the application protocol layer.

If the additional information sent between the Intermediary Node and the TLS Server is sent in the ClientHello and the ServerHello messages, then the TLS Server should exclude that information when calculating a hash over the TLS messages, otherwise the TLS Client and the TLS Server will calculate different hashes.

Figure 17:
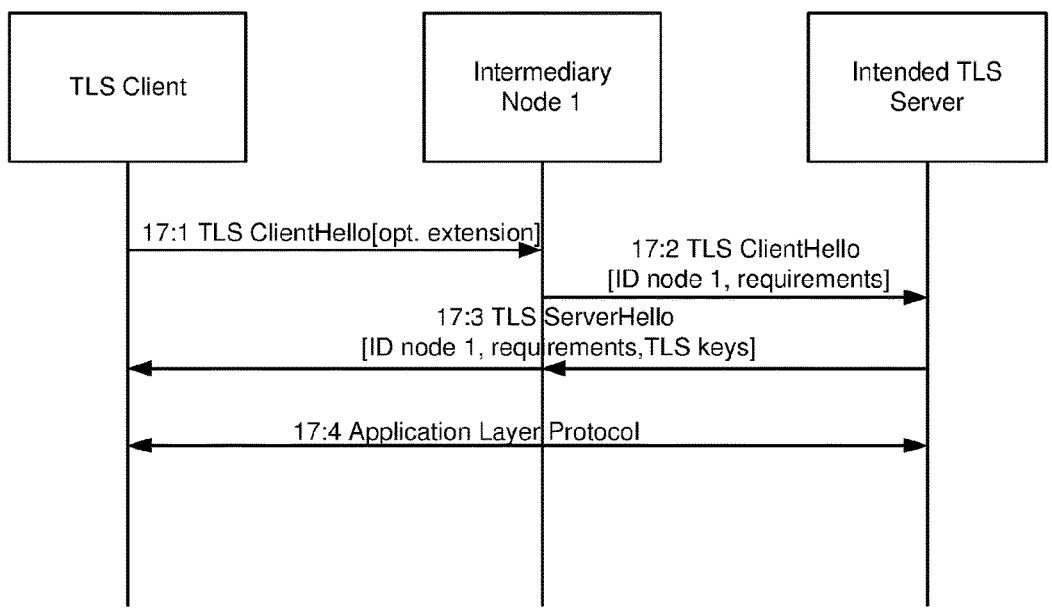
FIG. 17 is a signalling scheme illustrating signalling between a TLS Client and a TLS Server according to an eighths embodiment.

Another Alternative embodiment will now be described with reference to the signaling scheme in FIG. 17.

In a first step 17:1, the TLS Client sends a ClientHello towards the TLS Server, this ClientHello does not include an Identity of an Intermediary Node, but it may include some kind of information (e.g. an extension), indicating that the TLS Client accepts an Intermediary Node, or that it accepts one or more Intermediary Nodes, already included by the TLS Server.

The Intermediary Node intercepts the ClientHello and adds some or all of the following: The Intermediary Node's identity (e.g. by including its certificate), a list of its requirements, and a MAC/signature proving that it was the Intermediary Node that added the information. The message is then sent to the TLS Server, as indicated in step 17:2. The Intermediary Node could alternatively just forward the ClientHello and send the additional information in another message to the TLS Server.

If the TLS Server agrees to include the Intermediary Node it includes the TLS keys into its ServerHello, which is illustrated with step 17:3.

The Intermediary Node intercepts the ServerHello and extracts the included TLS keys. With the keys the Intermediary Node can perform some service on the application protocol layer. With the information in the ServerHello the TLS Client can see the identity of the inserted Intermediary Node and its capabilities/requirements. The TLS Client can then decide if this is acceptable and continue or cancel the TLS handshake.

If the additional information sent between the Intermediary Node and the TLS Server is sent in the ClientHello messages, then the TLS Server should exclude that information when calculating a hash over the TLS messages. The TLS Client and the TLS Server should both include or both exclude the additional (proxy) information in the ServerHello when calculating a hash over the TLS messages. If the additional (proxy) information is sent as an TLS extension and the TLS Client did not include the same extension in the ClientHello sent from the TLS Client, then it should not treat this as a fatal error as specified by the current version of TLS.

Figure 18:
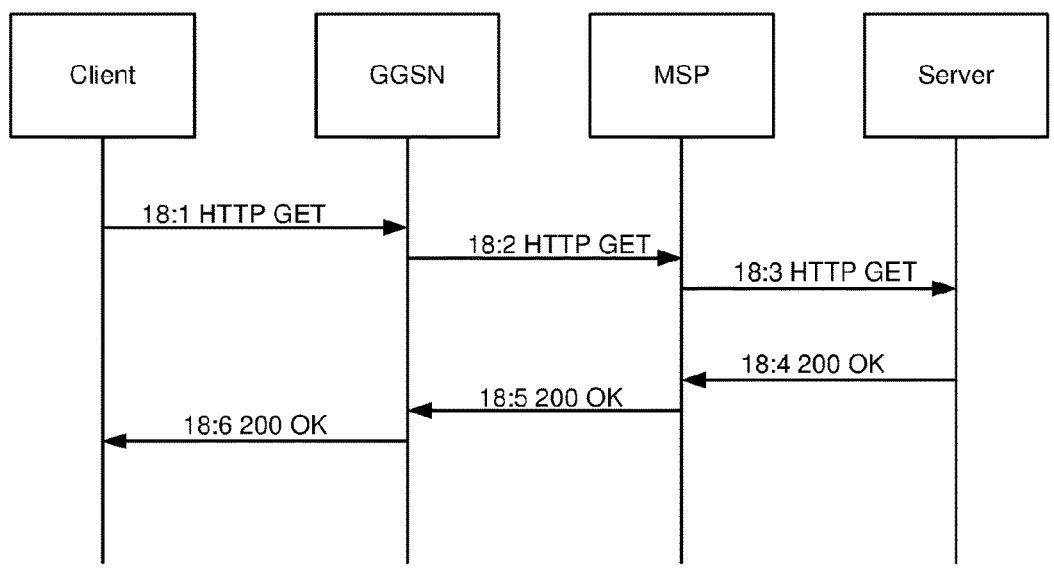
FIG. 18 is a signalling scheme illustrating signalling between a non-TLS Client and a non-TLS Server according to prior art.
Figure 19:
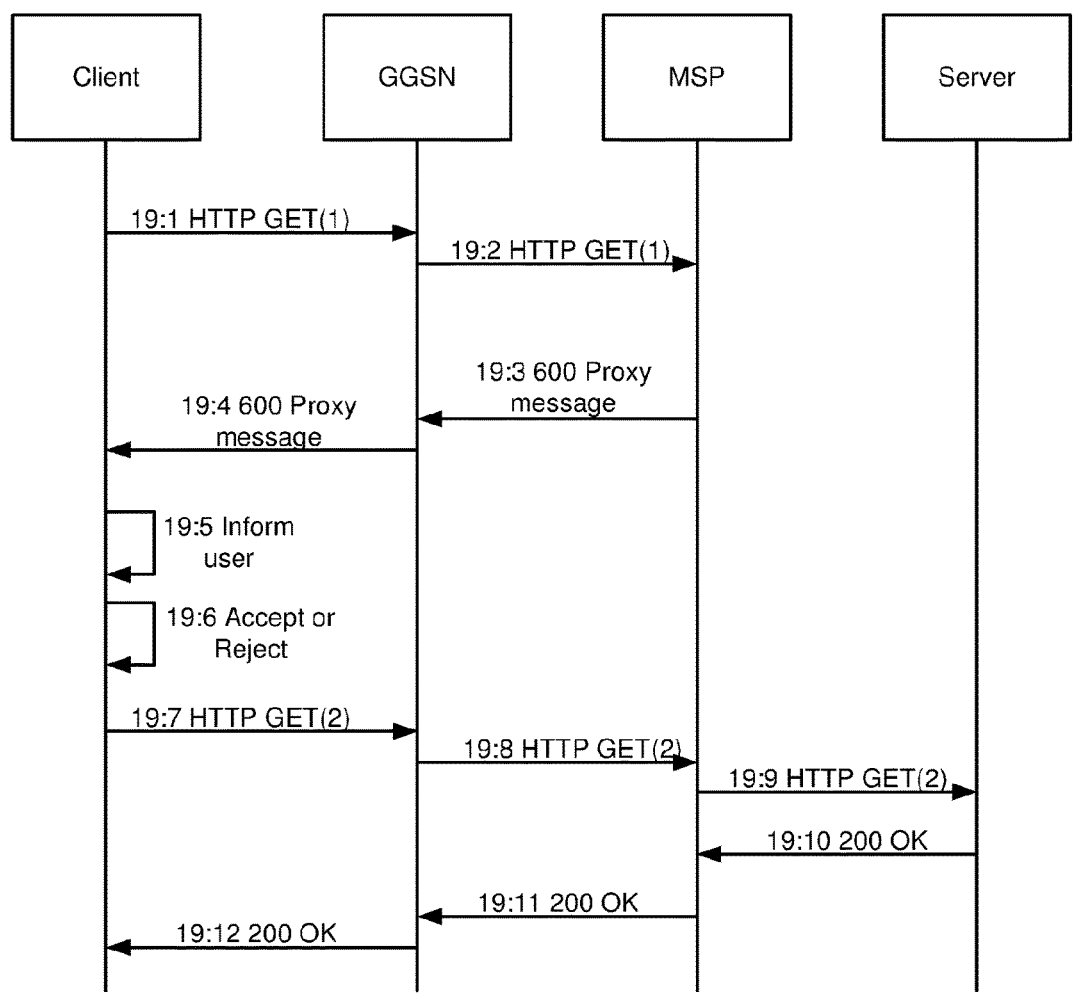
FIG. 19 is a signalling scheme illustrating signalling between a non-TLS Client and a non-TLS Server according to a first embodiment.
Figure 20:
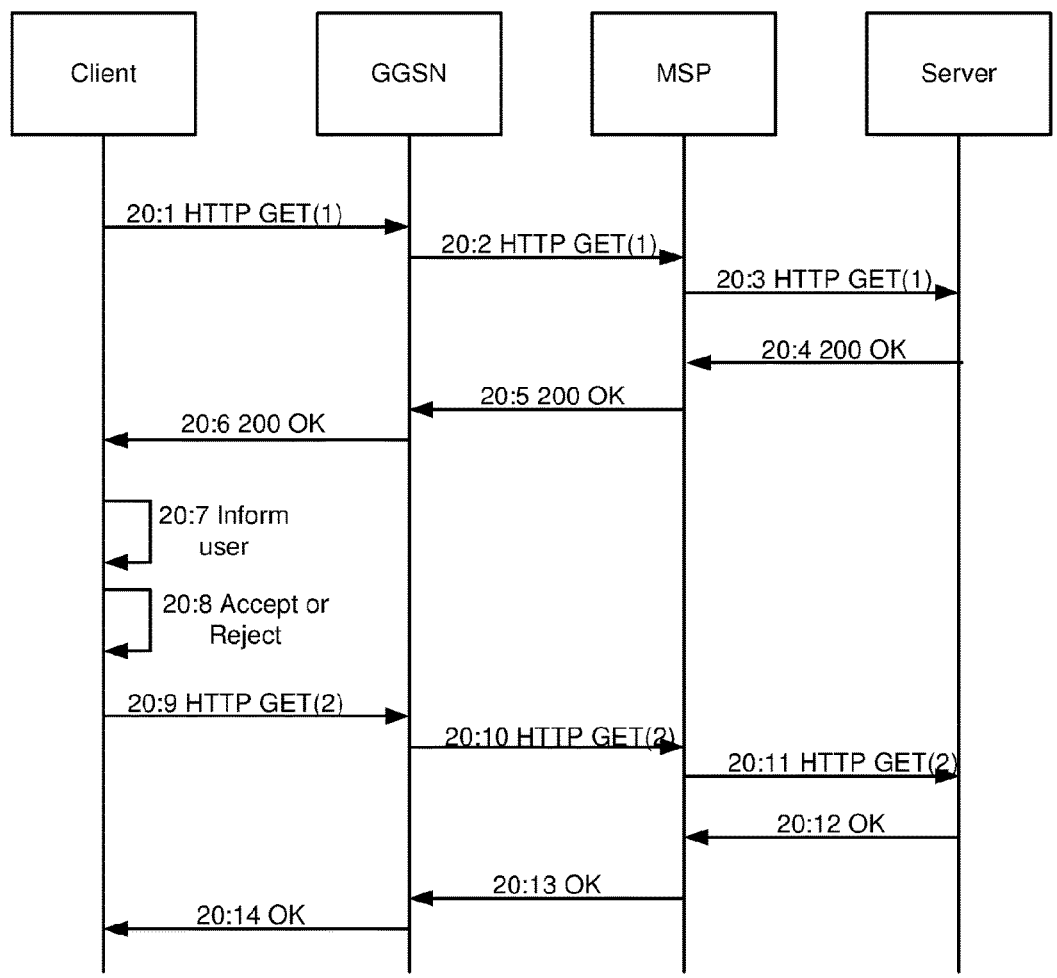
FIG. 20 is a signalling scheme illustrating signalling between a non-TLS Client and a non-TLS Server according to a second embodiment.

With reference to FIGS. 18-20, an alternative embodiment of discovery of an Intermediary Node, initially not using TLS, will now be given.

FIG. 18 shows a normal (prior art) flow between a Client and a Server, setting up a connection via a GGSN and an MSP, where the end nodes cannot control any Intermediary Node, as has been suggested according to any of the methods above, while FIG. 19 illustrates a method according to the basic concept described herein, i.e. at least the client, which does not use TLS, or which may at least not apply TLS initially, can control the participation of an Intermediary Node. The method according to FIG. 19 comprises the following steps:

The Client sends a request (e.g. HTTP get) toward a Server, via GGSN, in step 19:1 and a step 19:2 to an Intermediary Node, here referred to as MSP. The Intermediary Node observes the request and detects that it is desirable for it to perform certain functions on the Client-Server connection, about to be stet-up. The Intermediary Node therefore responds (e.g. 600 message), indicating its presence (e.g. by including a certificate) and optionally additional information, such as e.g. information mentioned earlier (e.g. which function it desires to perform), as indicated with step 19:3, which is forwarded to the Client by GGSN in another step 19:4. Before forwarding the response, the proxy authenticates (e.g. signs) at least part of the added information (e.g. using keys associated with the certificate). The Client can now evaluate whether to accept the Intermediary Node (MSP) or not. Here, this is indicated with step 19:5, indicating the option to the user of Client, and step 19:6, indicating that the user/Client is accepting the Intermediary Node in the communication or not. In a subsequent step, the Client transmits a another message destined for the Server, here in another HTTP GET, as indicated with step 19:7, which message is forwarded to the Intermediate node in step 19:8 and to the Server in step 19:9. The Server verifies in step 19:10, which is forwarded to the Client in steps 19:11 and 19:12.

Another embodiment which is illustrated in FIG. 20, illustrates how the Intermediary Node first forwards the request to the Server in step 20:3, and then adds the information as described above just before forwarding the response (e.g. a 200 OK) to the Client in a step 20:5.

Yet another option allows the Intermediary Node to add or modify also security configuration in case the Client did not request it. For example, with reference to the FIG. 19, the Intermediary Node could instead respond with a message (e.g. error message) indicating its presence and also add information proposing to the Client to use TLS (or some other security protocol). Information (or parts thereof) are preferably signed as above. The Client can then evaluate this proposal and accept/reject accordingly, as indicated above, i.e. by executing steps which corresponds to steps 19:7-19: 12 in FIG. 19. In other words, the Intermediary Node can, as part of its requirements, "upgrade" a requested connection from using non-TLS to using TLS.

The invention claimed is:

1. A method executed by a Server with which a Client is requesting to set-up a connection, wherein an Intermediary Node is arranged between the Client and the Server in a communication network, the method comprising:
   receiving, from the Intermediary Node, in response to the Intermediary Node having intercepted a first message, transmitted from the client and destined for the Server, a second message, requesting to set up the connection between the Client and the Server and comprising an identity of the Intermediary Node and information on requirements of the Intermediary Node to perform at least one function on messages exchanged between the Client and the Server during the requested connection;
   determining to accept the participation of the identified Intermediary Node in the connection set-up based on the information on the requirements of the Intermediary Node;
   responsive to determining to accept the participation of the identified Intermediary Node, continuing the initiated set-up of the requested connection between the Client and the Server via the Intermediary Node, and
   responsive to determining to accept the participation of the Intermediary Node, altering an operation of the Server based on the information on the requirements of the Intermediary node.

2. The method according to claim 1, wherein determining comprises determining whether to accept or reject the participation of the identified Intermediary Node in the connection set-up based on the information on the requirements of the Intermediary Node, the method further comprising:
   responsive to determining to reject the participation of the identified Intermediary Node, continuing the initiated set-up of the requested connection, but without participation of the Intermediary Node.

3. The method according to claim 1, wherein the continuing of the initiated set-up comprises providing at least one encryption and/or authentication key to the Intermediary Node, thereby enabling the Intermediary Node to access the connection.

4. The method according to claim 1, wherein the set-up connection enables a Transfer Layer Security (TLS) or a Datagram Transfer Layer Security (DTLS) communication.

5. The method according to claim 1, wherein determining whether to accept or reject the participation of the identified Intermediary Node comprises determining that the Client has accepted the Intermediary Node for inclusion during the requested connection.

6. The method according to claim 1, wherein altering the operation of the Server comprises disabling encryption of the requested connection.

* * * * *